United States Patent
Park et al.

(10) Patent No.: US 11,302,477 B2
(45) Date of Patent: *Apr. 12, 2022

(54) MULTILAYER CERAMIC ELECTRONIC COMPONENT

(71) Applicant: SAMSUNG ELECTRO-MECHANICS CO., LTD., Suwon-si (KR)

(72) Inventors: Myung Jun Park, Suwon-si (KR); Jong Ho Lee, Suwon-si (KR); Jang Yeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,612

(22) Filed: Oct. 2, 2020

(65) Prior Publication Data

US 2021/0020369 A1   Jan. 21, 2021

Related U.S. Application Data

(63) Continuation of application No. 16/189,143, filed on Nov. 13, 2018, now Pat. No. 10,818,436.

(30) Foreign Application Priority Data

Sep. 3, 2018   (KR) .................. 10-2018-0104703

(51) Int. Cl.
*H01G 4/232* (2006.01)
*H01G 4/30* (2006.01)
(Continued)

(52) U.S. Cl.
CPC ............. *H01G 4/232* (2013.01); *H01G 4/012* (2013.01); *H01G 4/224* (2013.01); *H01G 4/30* (2013.01)

(58) Field of Classification Search
CPC .......... H01G 4/232; H01G 4/224; H01G 4/30
See application file for complete search history.

(56) References Cited

U.S. PATENT DOCUMENTS 6,381,117 B1   4/2002   Nakagawa
8,988,850 B1   3/2015   Kodama et al.
(Continued)

FOREIGN PATENT DOCUMENTS

CN   104045339 A   9/2014
CN   104576052 A   4/2015
(Continued)

OTHER PUBLICATIONS

Office Action issued in corresponding Korean Application No. 10-2018-0104703, dated Jul. 1, 2019.
(Continued)

*Primary Examiner* — Eric W Thomas
(74) *Attorney, Agent, or Firm* — Morgan, Lewis & Bockius LLP (57) ABSTRACT

A multilayer ceramic electronic component includes: a ceramic body including dielectric layers and a plurality of internal electrodes disposed to face each other with each of the dielectric layers interposed therebetween; and external electrodes disposed on external surfaces of the ceramic body and electrically connected to the internal electrodes, respectively, in which the external electrode each include an electrode layer electrically connected to the internal electrodes and a plating layer disposed on the electrode layer, and a thickness of the electrode layer in a cross section of the ceramic body in first and second directions is 10 μm or more.

18 Claims, 4 Drawing Sheets

(51) Int. Cl.
  *H01G 4/224* (2006.01)
  *H01G 4/012* (2006.01)

(56) References Cited

U.S. PATENT DOCUMENTS

| | | |
|---|---|---|
| 9,190,209 B2 | 11/2015 | Kang et al. |
| 10,026,556 B2 | 7/2018 | Ando et al. |
| 10,325,721 B2 | 6/2019 | Murasawa et al. |
| 10,818,436 B2 * | 10/2020 | Park ........................ H01G 4/012 |
| 2011/0141658 A1 | 6/2011 | Na |
| 2012/0147518 A1 | 6/2012 | Matsuda et al. |
| 2013/0083449 A1 | 4/2013 | Yoon |
| 2014/0209363 A1 | 7/2014 | Oh |
| 2014/0268484 A1 | 9/2014 | Kang |
| 2016/0163453 A1 | 6/2016 | Ikeda |
| 2016/0284473 A1 | 9/2016 | Murosawa |
| 2016/0293331 A1 | 10/2016 | Kitamura et al. |
| 2017/0098506 A1 | 4/2017 | Ando |
| 2017/0256359 A1 | 9/2017 | Masunari |
| 2017/0301464 A1 | 10/2017 | Terashita |
| 2018/0102217 A1 | 4/2018 | Fukunaga |
| 2018/0190432 A1 | 7/2018 | Kitamura et al. |

FOREIGN PATENT DOCUMENTS

| | | |
|---|---|---|
| CN | 106024382 A | 10/2016 |
| CN | 106971846 A | 7/2017 |
| JP | 2012-199597 A | 10/2012 |
| JP | 5316642 A | 10/2013 |
| JP | 2015-053526 A | 3/2015 |
| JP | 2016-189423 A | 11/2016 |
| JP | 2018-063969 A | 4/2018 |
| KR | 10-2015-0048045 A | 5/2015 |

OTHER PUBLICATIONS

Non-Final Office Action dated Jan. 31, 2019 in U.S. Appl. No. 16/189,143.
Non-Final Office Action dated Sep. 13, 2019 in U.S. Appl. No. 16/189,143.
Non-Final Office Action dated Mar. 13, 2020 in U.S. Appl. No. 16/189,143.
Final Office Action dated Apr. 24, 2019 in U.S. Appl. No. 16/189,143.
Notice of Allowance dated Jun. 22, 2020 in U.S. Appl. No. 16/189,143.
Chinese Office Action dated Feb. 18, 2022 issued in Chinese Patent Application No. 201910098428.7 (with English translation).

* cited by examiner

MULTILAYER CERAMIC ELECTRONIC COMPONENT

CROSS-REFERENCE TO RELATED APPLICATION(S)

This application is a continuation of U.S. patent application Ser. No. 16/189,143 filed on Nov. 13, 2018 which claims the benefit of priority to Korean Patent Application No. 10-2018-0104703 filed on Sep. 3, 2018 in the Korean Intellectual Property Office, the disclosures of each are incorporated herein by reference in their entirety.

TECHNICAL FIELD

The present disclosure relates to a multilayer ceramic electronic component, and more particularly, to a method of manufacturing a multilayer ceramic electronic component having excellent reliability.

BACKGROUND

Generally, electronic components using a ceramic material, such as a capacitor, an inductor, a piezoelectric element, a varistor, a thermistor, and the like, include a ceramic body formed of the ceramic material, internal electrodes formed in the ceramic body, and external electrodes installed on surfaces of the ceramic body to be connected to the internal electrodes.

A multilayer ceramic capacitor, among multilayer ceramic electronic components, includes a plurality of stacked dielectric layers, internal electrodes disposed to face each other with each of the dielectric layers interposed therebetween, and external electrodes electrically connected to the internal electrodes.

The multilayer ceramic capacitor has been widely used as components of mobile communications devices such as a computer, a personal digital assistant (PDA), a cellular phone, and the like, since it has a small size, implements high capacitance, and may be easily mounted.

Recently, in accordance with performance improvement and thinness and lightness of electrical and electronic devices, a size decrease, performance improvement, and an increase in capacitance of electronic components have been demanded.

Particularly, in accordance with an increase in capacitance and miniaturization of the multilayer ceramic capacitor, technology of significantly increasing capacitance per unit volume has been required.

Therefore, the high capacitance needs to be implemented by significantly decreasing a volume of the internal electrodes while implementing an area of the internal electrodes as much as possible to increase the number of stacked layers.

However, in accordance with the capacitance increase and the miniaturization of the multilayer ceramic capacitor, it has been important to secure reliability, particularly, moisture proof reliability, of the multilayer ceramic capacitor.

SUMMARY

An aspect of the present disclosure may provide a multilayer ceramic electronic component having excellent reliability, and a method of manufacturing the same.

According to an aspect of the present disclosure, a multilayer ceramic electronic component may include: a ceramic body including dielectric layers and a plurality of internal electrodes disposed to face each other with each of the dielectric layers interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on external surfaces of the ceramic body and electrically connected to the internal electrodes, respectively, wherein the external electrode includes an electrode layer electrically connected to the internal electrodes and a plating layer disposed on the electrode layer, and a thickness of the electrode layer in a cross section of the ceramic body in the first and second directions is 10 μm or more.

According to another aspect of the present disclosure, a multilayer ceramic electronic component may include: a ceramic body including dielectric layers and a plurality of internal electrodes disposed to face each other with each of the dielectric layers interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on external surfaces of the ceramic body and electrically connected to the internal electrodes, respectively, wherein the external electrode includes an electrode layer electrically connected to the internal electrodes and a plating layer disposed on the electrode layer, and a thickness of the electrode layer in a cross section of the ceramic body in the first and third directions is 7 μm or more.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

An exemplary embodiment in the present disclosure relates to a ceramic electronic component, and an example of an electronic component using a ceramic material may include a capacitor, an inductor, a piezoelectric element, a varistor, a thermistor, or the like. Hereinafter, a multilayer ceramic capacitor will be described as an example of the ceramic electronic component.

Figure 1:
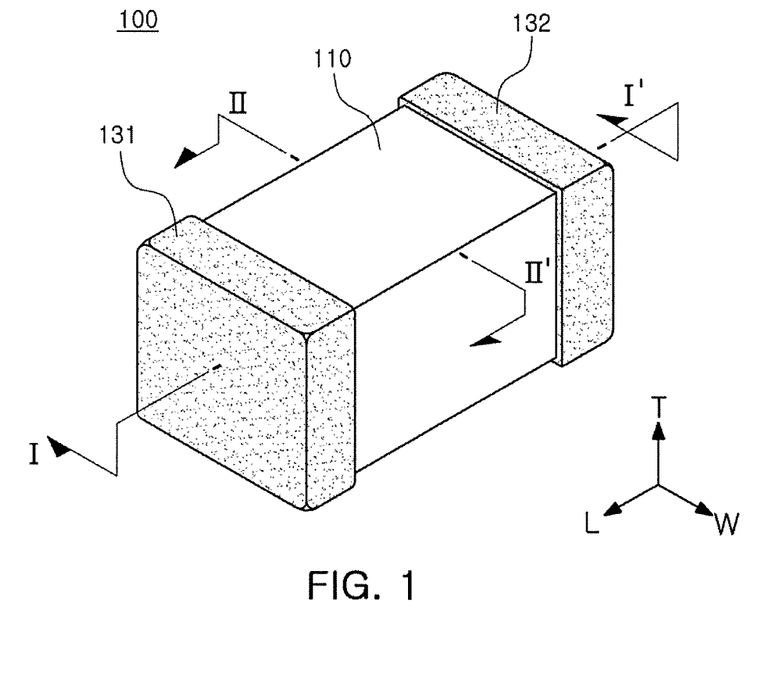
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
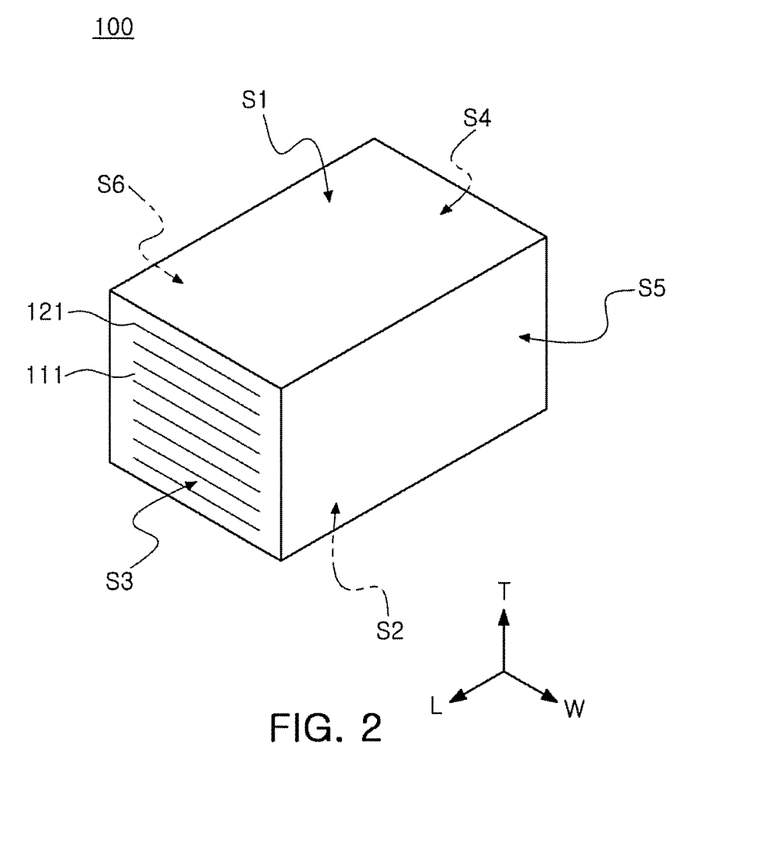
FIG. 2 is a schematic view illustrating a ceramic body according to an exemplary embodiment in the present disclosure.

FIG. 2 is a schematic view illustrating a ceramic 5 body according to an exemplary embodiment in the present disclosure.

Figure 3:
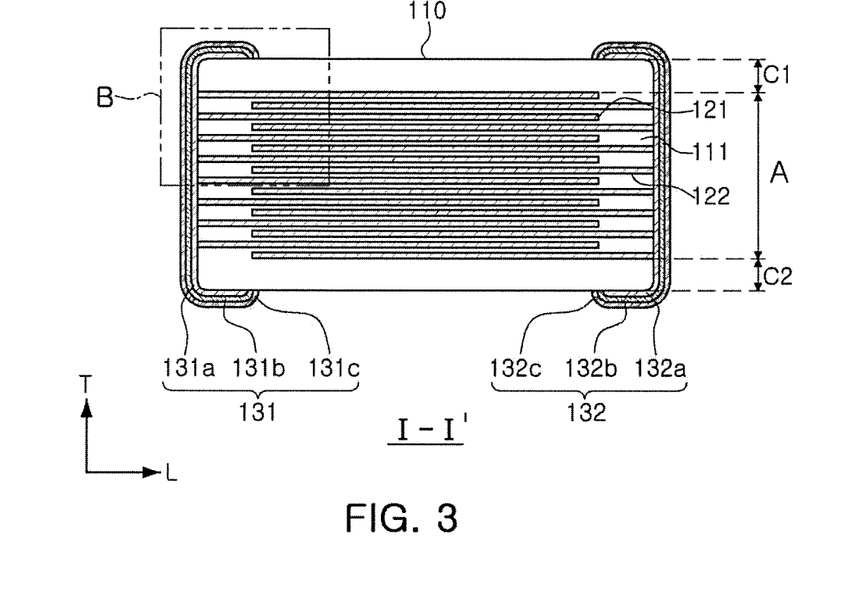
FIG. 3 is a cross-sectional view taken along line I-I' of FIG. 1.

FIG. 3 is a cross-sectional view taken along line II' of FIG. 1.

Figure 4:
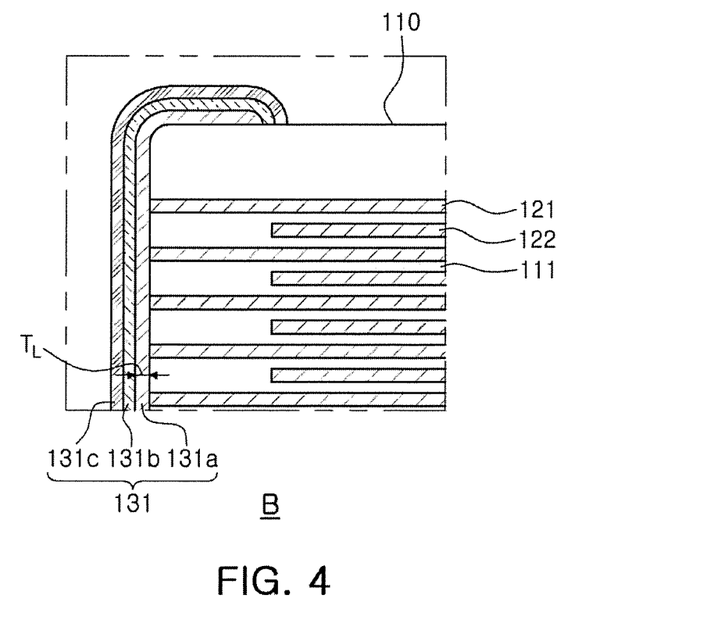
FIG. 4 is an enlarged view of region B of FIG. 3.

FIG. 4 is an enlarged view of region B of FIG. 3.

Referring to FIGS. 1 through 4, a multilayer ceramic capacitor according to an exemplary embodiment in the present disclosure may include a ceramic body 110, internal electrodes 121 and 122 formed in the ceramic body, and external electrodes 131 and 132 formed on external surfaces of the ceramic body 110.

In an exemplary embodiment in the present disclosure, a 'length direction' of the multilayer ceramic capacitor refers to an 'L' direction of FIG. 1, a 'width direction' of the multilayer ceramic capacitor refers to a 'W' direction of FIG. 1, and a 'thickness direction' of the multilayer ceramic capacitor refers to a 'T' direction of FIG. 1. The 'thickness direction' refers to a direction in which the dielectric layers are stacked, that is, a 'stack direction'.

A shape of the ceramic body 110 is not particularly limited, but may be a hexahedral shape according to an exemplary embodiment in the present disclosure.

The ceramic body 110 may have first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces and opposing each other in a third direction.

The first and second surfaces S1 and S2 refer to surfaces of the ceramic body 110 opposing each other in the thickness direction, which is the first direction, the third and fourth surfaces S3 and S4 refer to surfaces of the ceramic body 110 opposing each other in the length direction, which is the second direction, and the fifth and sixth surfaces S5 and S6 refer to surfaces of the ceramic body 110 opposing each other in the width direction, which is the third direction.

One ends of a plurality of internal electrodes 121 and 122 formed in the ceramic body 110 may be exposed to the third surface S3 or the fourth surface S4 of the ceramic body 110.

The internal electrodes 121 and 122 may have a pair of first and second internal electrodes 121 and 122 having different polarities.

One ends of the first internal electrodes 121 may be exposed to the third surface S3, and one ends of the second internal electrodes 122 may be exposed to the fourth surface S4.

The other ends of the first internal electrodes 121 and the second internal electrodes 122 may be formed to be spaced apart from the fourth surface S4 or the third surface S3 by a predetermined interval. More detailed contents for this will be described below.

First and second external electrodes 131 and 132 may be formed on the third and fourth surfaces S3 and S4 of the ceramic body 110, respectively, and may be electrically connected to the internal electrodes.

A thickness of each of the internal electrodes 121 and 122 is not particularly limited, and may be, for example, 0.4 μm or less.

According to an exemplary embodiment in the present disclosure, the number of dielectric layers on which the internal electrodes are formed may be 200 or more.

According to an exemplary embodiment in the present disclosure, the ceramic body 110 may be formed by stacking a plurality of dielectric layers 111.

The plurality of dielectric layers 111 forming the ceramic body 110 may be in a sintered state, and adjacent dielectric layers may be integrated with each other so that boundaries therebetween are not readily apparent.

The dielectric layer 111 may be formed by sintering a ceramic green sheet including ceramic powders.

The ceramic powder is not particularly limited, and may be any ceramic powder that is generally used in the related art.

The ceramic powder may include, for example, a BaTiO3-based ceramic powder, but is not limited thereto.

An example of the BaTiO3-based ceramic powder may include (Ba1_xCax)TiO3, Ba(Ti1_yCay)O3, (Ba1-xCax)(TiZry)O3, 10 Ba(Ti1_yZry)O3, or the like, in which Ca, Zr, or the like, is partially solid-solved in BaTiO3, but is not limited thereto.

In addition, the ceramic green sheet may include a transition metal, rare earth elements, magnesium (Mg), aluminum (Al), or the like, together with the ceramic powders.

A thickness of one dielectric layer 111 may be appropriately changed in accordance with a capacitance design of the multilayer ceramic capacitor.

A thickness of the dielectric layer 111 formed between two adjacent internal electrode layers after being sintered may be, for example, 0.4 μm or less, but is not limited thereto.

According to an exemplary embodiment in the present disclosure, the thickness of the dielectric layers 111 refers to an average thickness.

The average thickness of the dielectric layers 111 may be measured by an image, captured by a scanning electron microscope (SEM), of a cross section of the ceramic body 110 in the length direction, as illustrated in FIG. 2.

For example, with respect to any dielectric layer extracted from an image, captured by the scanning electron microscope (SEM), of a cross section of the ceramic body 110 cut in a length and thickness L-T direction at a central portion of the ceramic body 110 in the width W direction as illustrated in FIG. 2, thicknesses of the dielectric layer may be measured at thirty points arranged at equal intervals in the length direction to measure an average value thereof.

The thirty points arranged at equal intervals may be measured in a capacitance forming portion that refers to a region in which the internal electrodes 121 and 122 overlap each other.

In addition, when an average thickness of ten or more dielectric layers is measured, the average thickness of the dielectric layers may further be generalized.

The ceramic body 110 may include an active portion A contributing to forming capacitance of the multilayer ceramic capacitor, and upper and lower cover portions C1 and C2 disposed on upper and lower surfaces of the active portion A, respectively, as upper and lower margin portions.

The active portion A may be formed by repeatedly stacking a plurality of first and second internal electrodes 121 and 122 with each of the dielectric layers 111 interposed therebetween.

The upper and lower cover portions C1 and C2 may be formed of the same material as that of the dielectric layer 111 and have the same configuration as that of the dielectric layer 111 except that they do not include the internal electrodes.

That is, the upper and lower cover portions C1 and C2 may include a ceramic material such as a barium titanate (BaTiO3)-based ceramic material.

The upper and lower cover portions C1 and C2 may be formed by stacking a single dielectric layer or two or more dielectric layers on the upper and lower surfaces of the active portion A, respectively, in a vertical direction, and may basically serve to prevent damage to the internal electrodes due to physical or chemical stress.

Each of the upper and lower cover portions C1 and C2 may have a thickness of 20 µm or less, but is not necessarily limited thereto.

Recently, in accordance with performance improvement and thinness and lightness of electrical and electronic devices, a size decrease, performance improvement, and an increase in capacitance of electronic components have been demanded. Therefore, the thicknesses of the upper and lower cover portions disposed in the ceramic body as described above have been decreased.

As in an exemplary embodiment in the present disclosure, when each of the upper and lower cover portions C1 and C2 has the thickness of 20 µm or less, the thickness of each of the upper and lower cover portions may be small, such that external moisture and a plating solution may easily permeate into the ceramic body. Therefore, it is likely that a moisture proof reliability defect of the multilayer layer capacitor will occur.

In order to solve such a problem, according to an exemplary embodiment in the present disclosure, the moisture proof reliability of the multilayer layer capacitor may be improved by controlling thicknesses of electrode layers in a cross section of the ceramic body in a length-thickness direction and a cross section of the ceramic body in a width-thickness direction.

That is, in an exemplary embodiment in the present disclosure, a subminiature and high-capacitance multilayer ceramic capacitor, when each of the upper and lower cover portions C1 and C2 has the small thickness of 2011 m or less, a thickness of an electrode layer included in the external electrode may be controlled in order to improve the moisture proof reliability.

Therefore, in a multilayer ceramic capacitor according to the related art in which a thickness of each of the upper and lower cover portions C1 and C2 exceeds 20 µm, even though the thicknesses of the electrode layers in the cross section of the ceramic body in the length-thickness direction and the cross section of the ceramic body in the width-thickness direction are not controlled unlike an exemplary embodiment in the present disclosure, the moisture proof reliability is not problematic.

A material of each of the first and second internal electrodes 121 and 122 is not particularly limited, but may be a conductive paste including one or more of silver (Ag), lead (Pb), platinum (Pt), nickel (Ni), and copper (Cu).

The multilayer ceramic capacitor according to an exemplary embodiment in the present disclosure may include the first external electrode 131 electrically connected to the first internal electrodes 121 and the second external electrode 132 electrically connected to the second internal electrodes 122.

The first and second external electrodes 131 and 132 may be electrically connected to the first and second internal electrodes 121 and 122, respectively, in order to form capacitance, and the second external electrode 132 may be connected to a potential different to a potential to which the first external electrode 131 is connected.

The first and second external electrodes 131 and 132 may be disposed, respectively, on the third and fourth surfaces S3 and S4 of the ceramic body 110 in the length direction, which is the second direction, and may extend to the first and second surfaces S1 and S2 of the ceramic body 110 in the thickness direction, which is the first direction.

The external electrodes 131 and 132 may include, respectively, electrode layers 131a and 132a disposed on the external surfaces of the ceramic body 110 and electrically connected to the internal electrodes 121 and 122, respectively, and plating layers 131b and 131c, and 132b and 132c disposed on the electrode layers 131a and 132a, respectively.

The external electrodes 131 and 132 may include the first external electrode 131 and the second external electrode 132 disposed on one surface and the other surface of the ceramic body 110, respectively.

The electrode layers 131a and 132a may include a conductive metal and a glass.

The conductive metal used in the electrode layers 131a and 132a may be any material that may be electrically connected to the internal electrodes in order to form the capacitance, for example, one or more selected from the group consisting of copper (Cu), silver (Ag), nickel (Ni), and alloys thereof.

The electrode layers 131a and 132a may be formed by applying and then sintering a conductive paste prepared by adding glass frit to conductive metal powders.

That is, each of the electrode layers 131a and 132a may be a sintering type electrode formed by sintering the paste including the conductive metal.

The conductive metal included in the electrode layers 131a and 132a may be electrically conducted to the first and second internal electrodes 121 and 122 to implement electrical characteristics.

The glass included in the electrode layers 131a and 132a may serve as a sealing material blocking external moisture together with the conductive metal.

The first external electrode 131 may include a first electrode layer 131a disposed on one surface of the ceramic body 110 in the length direction L, which is the second direction, and electrically connected to the first internal electrodes 121, and first plating layers 131b and 131c disposed on the first electrode layer 131a.

In addition, the second external electrode 132 may include a second electrode layer 132a disposed on the other surface of the ceramic body 110 in the length direction L, which is the second direction, and electrically connected to the second internal electrodes 122, and second plating layers 132b and 132c disposed on the second electrode layer 132a.

The electrode layers 131a and 132a may be disposed on opposite end surfaces of the ceramic body 110 in the length direction, respectively, and extend to portions of the first and second surfaces S1 and S2, which are upper and lower surfaces of the ceramic body 110.

In addition, the plating layers 131b and 131c, and 132b and 132c may be disposed on the electrode layers 131a and 132a, respectively.

The electrode layers 131a and 132a may be formed of the same conductive metal as that of the first and second internal electrodes 121 and 122, but are not limited thereto. For example, the electrode layers 131a and 132a may be formed of copper (Cu), silver (Ag), nickel (Ni), or alloys thereof.

The plating layers 131b, 131c, 132b, and 132c may include nickel plating layers 131b and 132b and tin plating layers 131c and 132c each disposed on the nickel plating layers 131b and 132b, but are limited thereto.

According to an exemplary embodiment in the present disclosure, a thickness Ti. of each of the electrode layers 131a and 132a in a cross section of the ceramic body 110 in the first and second directions may be 10 µm or more.

The first direction of the ceramic body 110 refers to the thickness direction of the ceramic body 110, the second direction of the ceramic body 110 refers to the length direction of the ceramic body 110, and the cross section of the ceramic body 110 in the first and second directions refers to a cross section of the ceramic body 110 in the length-thickness direction.

The thickness TL of each of the electrode layers 131a and 132a in the cross section of the ceramic body 110 in the first and second directions may be controlled to be 10 μm or more to improve the moisture proof reliability of the multilayer ceramic electronic component.

That is, in order to prevent a decrease in the moisture proof reliability of the multilayer ceramic electronic component, the thickness TL of each of the electrode layers 131a and 132a in the cross section of the ceramic body 110 in the first and second directions needs to be at least 10 μm or more.

Particularly, in a product in which the dielectric layer and the internal electrodes formed of thin films are used, such as a product in which a thickness of the dielectric layer 111 after being sintered is 0.4 μm or less and a thickness of each of the first and second internal electrodes 121 and 122 after being sintered is 0.4 μm or less, a decrease in the moisture proof reliability may be problematic.

Therefore, when the thickness of the dielectric layer 111 is 0.4 μm or less and the thickness of each of the first and second internal electrodes 121 and 122 is 0.4 μm or less, the thickness TL of each of the electrode layers 131a and 132a in the cross section of the ceramic body 110 in the first and second directions needs to be controlled to be 10 μm or more as in an exemplary embodiment in the present disclosure, in order to prevent the decrease in the moisture proof reliability.

When the thickness $T_L$ of each of the electrode layers 131a and 132a in the cross section of the ceramic body 110 in the first and second directions is less than 10 μm, the moisture proof reliability of the multilayer ceramic electronic component may be decreased.

Particularly, in a case in which the thickness of the dielectric layer 111 is 0.4 μm or less and the thickness of each of the first and second internal electrodes 121 and 122 is 0.4 μm or less, when the thickness TL of each of the electrode layers 131a and 132a in the cross section of the ceramic body 110 in the first and second directions is less than 10 μm, the moisture proof reliability of the multilayer ceramic electronic component may be decreased.

However, the thin films do not mean that the thicknesses of the dielectric layer 111 and the first and second internal electrodes 121 and 122 are 0.4 μm or less, but may conceptually include that the thicknesses of the dielectric layer and the internal electrodes are smaller than those of the multilayer ceramic capacitor according to the related art.

Meanwhile, as the thickness TL of each of the electrode layers 131a and 132a in the cross section of the ceramic body 110 in the first and second directions is increased from a value of 10 μm or more, the moisture proof reliability of the multilayer ceramic electronic component may be improved, but there may be a limitation value in the thickness of each of the electrode layers 131a and 132a for implementing a subminiature and high-capacitance multilayer ceramic electronic component. Therefore, a separate upper limit value of the thickness of each of the electrode layers 131a and 132a is not limited herein.

Figure 5:
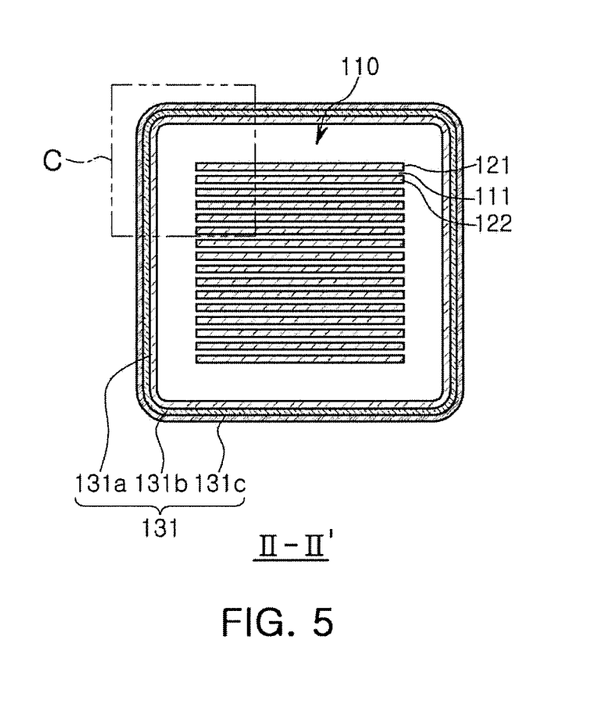
FIG. 5 is a cross-sectional view taken along line II-II' of FIG. 1.

FIG. 5 is a cross-sectional view taken along line II-II' of FIG. 1.

Figure 6:
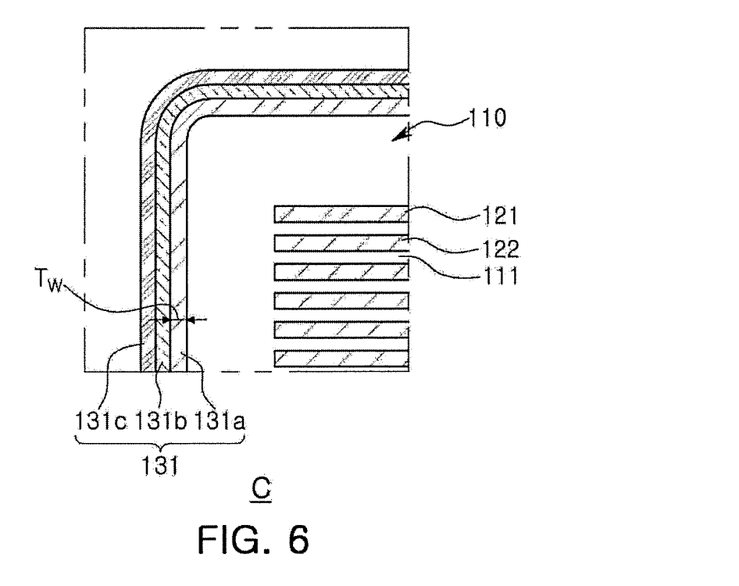
FIG. 6 is an enlarged view of region C of FIG. 5.

FIG. 6 is an enlarged view of region C of FIG. 5.

Referring to FIGS. 5 and 6, in the multilayer ceramic electronic component 100 according to an exemplary embodiment in the present disclosure, in addition to the feature described above, a thickness Tw of each of the electrode layers 131a and 132a in a cross section of the ceramic body 110 in the first and third directions may be 7 μm or more.

The first direction of the ceramic body 110 refers to the thickness direction of the ceramic body 110, the third direction of the ceramic body 110 refers to the width direction of the ceramic body 110, and the cross section of the ceramic body 110 in the first and third directions refers to a cross section of the ceramic body 110 in the width-thickness direction.

The thickness Tw of each of the electrode layers 131a and 132a in the cross section of the ceramic body 110 in the first and third directions may be controlled to be 7 μm or more to improve the moisture proof reliability of the multilayer ceramic electronic component.

That is, in order to prevent a decrease in the moisture proof reliability of the multilayer ceramic electronic component, the thickness Tw of each of the electrode layers 131a and 132a in the cross section of the ceramic body 110 in the first and third directions needs to be at least 7 μm or more.

Particularly, in the product in which the dielectric layer and the internal electrodes formed of the thin films are used, such as the product in which a thickness of the dielectric layer 111 after being sintered is 0.4 μm or less and a thickness of each of the first and second internal electrodes 121 and 122 after being sintered is 0.4 μm or less, a decrease in the moisture proof reliability may be problematic.

Therefore, when the thickness of the dielectric layer 111 is 0.4 μm or less and the thickness of each of the first and second internal electrodes 121 and 122 is 0.4 μm or less, the thickness Tw of each of the electrode layers 131a and 132a in the cross section of the ceramic body 110 in the first and third directions needs to be controlled to be 7 μm or more as in an exemplary embodiment in the present disclosure, in order to prevent the decrease in the moisture proof reliability.

When the thickness Tw of each of the electrode layers 131a and 132a in the cross section of the ceramic body 110 in the first and third directions is less than 7 μm, the moisture proof reliability of the multilayer ceramic electronic component may be decreased.

Particularly, in a case in which the thickness of the dielectric layer 111 is 0.4 μm or less and the thickness of each of the first and second internal electrodes 121 and 122 is 0.4 μm or less, when the thickness Tw of each of the electrode layers 131a and 132a in the cross section of the ceramic body 110 in the first and third directions is less than 7 μm, the moisture proof reliability of the multilayer ceramic electronic component may be decreased.

Meanwhile, as the thickness Tw of each of the electrode layers 131a and 132a in the cross section of the ceramic body 110 in the first and third directions is increased from a value of 7 μm or more, the moisture proof reliability of the multilayer ceramic electronic component may be improved, but there may be a limitation value in the thickness of each of the electrode layers 131a and 132a for implementing a subminiature and high-capacitance multilayer ceramic electronic component. Therefore, a separate upper limit value of the thickness of each of the electrode layers 131a and 132a is not limited herein.

According to an exemplary embodiment in the present disclosure, in the product in which the dielectric layer and the internal electrodes formed of the thin films are used, such as the product in which the thickness of the dielectric layer 111 after being sintered is 0.4 μm or less and the thickness of each of the first and second internal electrodes 121 and 122 after being sintered is 0.4 μm or less, the thickness TL of each of the electrode layers 131a and 132a in the cross section of the ceramic body 110 in the first and second directions may be 10 μm or more and the thickness Tw of each of the electrode layers 131a and 132a in the cross section of the ceramic body 110 in the first and third directions may be 7 μm or more, in order to improve the moisture proof reliability.

That is, when the thickness TL of each of the electrode layers 131a and 132a in the cross section of the ceramic body 110 in the first and second directions is 10 μm or more and the thickness Tw of each of the electrode layers 131a and 132a in the cross section of the ceramic body 110 in the first and third directions is 7 μm or more, a moisture permeability rate may be decreased, such that the moisture proof reliability may be improved.

When any one of the thickness TL of each of the electrode layers 131a and 132a in the cross section of the ceramic body 110 in the first and second directions and the thickness Tw of each of the electrode layers 131a and 132a in the cross section of the ceramic body 110 in the first and third directions is out of a numeral range of the present disclosure, the moisture proof reliability may be decreased.

A method of manufacturing a multilayer ceramic capacitor according to an exemplary embodiment in the present disclosure will hereinafter be described.

According to an exemplary embodiment in the present disclosure, a plurality of ceramic green sheets may be prepared.

The ceramic green sheet may be manufactured by mixing ceramic powders, a binder, a solvent, and the like, with one another to prepare slurry and manufacturing the slurry in a sheet shape having a thickness of several micrometers by a doctor blade method. Then, the ceramic green sheet may be sintered to form one dielectric layer 111 as illustrated in FIG. 2.

A thickness of the ceramic green sheet may be 0.6 μm or less. Therefore, a thickness of the dielectric layer after being sintered may be 0.4 μm or less.

Then, a conductive paste for an internal electrode may be applied to the ceramic green sheets to form internal electrode patterns. The internal electrode patterns may be formed by a screen printing method or a gravure printing method.

The conductive paste for an internal electrode may include a conductive metal and an additive. The additive may be one or more of a non-metal or a metal oxide.

The conductive metal may include nickel. The additive may include barium titanate or strontium titanate as the metal oxide.

A thickness of the internal electrode pattern may be 0.5 μm or less. Therefore, a thickness of the internal electrode after being sintered may be 0.4 μm or less.

Then, the ceramic green sheets on which the internal electrode patterns are formed may be stacked and pressed in the stack direction. Therefore, a ceramic laminate in which the internal electrode patterns are formed may be manufactured.

Then, the ceramic laminate may be cut per region corresponding to one capacitor to be manufactured in a chip form.

In this case, the ceramic laminate may be cut so that one ends of the internal electrode patterns are alternately exposed through end surfaces.

Then, the laminate manufactured in the chip form may be sintered to manufacture the ceramic body.

The sintering process may be performed in a reducing atmosphere. In addition, the sintering process may be performed while controlling a temperature raising speed. The temperature raising speed may be 30° C./60 s to 50° C./60 s at 700° C. or less.

Then, the external electrodes covering the end surfaces of the ceramic body and electrically connected to the internal electrodes exposed to the end surfaces of the ceramic body may be formed. Then, plating layers formed of nickel, tin, or the like, may be formed on surfaces of the external electrodes.

Hereinafter, the present disclosure will be described in detail with reference to Inventive Example and Comparative Example.

Multilayer ceramic capacitors according to Inventive Examples and multilayer ceramic capacitors according to Comparative Examples were prepared by the following method.

Barium titanate powders, ethanol as an organic solvent, and polyvinyl butyral as a binder were mixed with one another and were ball-milled to prepare slurry. Then, a ceramic green sheet was manufactured using the slurry.

A conductive paste for an internal electrode containing nickel was printed on the ceramic green sheets to form the internal electrodes, and a green laminate formed by stacking the ceramic green sheets was isostatically pressed at 85° C. and at a pressure of 1,000 kgf/cm2.

The pressed green laminate was cut to manufacture a green chip, a de-binder process in which the cut green ship is maintained at 230° C. under an atmospheric condition for 60 hours was performed, and the green chip was sintered at 1000° C. to manufacture a sintered chip. The sintering was performed in a reducing atmosphere to prevent oxidation of the internal electrodes, and the reducing atmosphere was 1011 to 10-10 atm lower than Ni/NiO equilibrium oxygen partial pressure.

Electrode layers were formed on external surfaces of the sintered chip using a paste for an external electrode including copper powders and glass powders, and nickel plating layers and tin plating layers were formed on the electrode layers by electroplating.

A multilayer ceramic capacitor having a 0603 size was manufactured by the abovementioned method. The 0603 size may have a length and a width of 0.6 μm ±0.1 μm and 0.3 μm ±0.1 μm, respectively. Features of the multilayer ceramic capacitor were evaluated as follows.

Table 1 illustrates measurement results of moisture permeability rates depending on thicknesses TL and Tw of electrode layers including the copper powders and the glass powders according to Comparative Examples and Inventive Examples.

Measurement of the moisture permeability rates was performed at each thickness on four hundred samples with respect to each of Comparative Examples and Inventive Examples.

TABLE 1

| | Thickness TL (pm) of Electrode Layer in Length Direction | Thickness TW (pm) of Electrode Layer in Width Direction | Number of Reliability Defects |
|---|---|---|---|
| 1* | 5 | 4 | 15/400 |
| 2* | 5 | 7 | 12/400 |
| 3* | 5 | 10 | 13/400 |
| 4* | 8 | 4 | 4/400 |
| 5* | 8 | 7 | 1/400 |
| 6* | 8 | 10 | 1/400 |

TABLE 1-continued

| | Thickness TL (μm) of Electrode Layer in Length Direction | Thickness TW (μm) of Electrode Layer in Width Direction | Number of Reliability Defects |
|---|---|---|---|
| 7* | 10 | 4 | 2/400 |
| 8 | 10 | 7 | 0/400 |
| 9 | 10 | 10 | 0/400 |
| 10* | 15 | 4 | 1/400 |
| 11 | 15 | 7 | 0/400 |
| 12 | 15 | 10 | 0/400 |
| 13* | 20 | 4 | 1/400 |
| 14 | 20 | 7 | 0/400 |
| 15 | 20 | 10 | 0/400 |

*Comparative Example

It may be seen from Table 1 that in Samples 1 to 6, which are Comparative Examples in which the thicknesses TL of each of the electrode layers 131a and 132a in the cross section of the ceramic body 110 in the first and second directions are less than 10 μm, a moisture proof reliability defect occurs regardless of the thicknesses Tw of each of the electrode layers 131a and 132a in the cross section of the ceramic body 110 in the first and third directions.

In addition, it may be seen that in Sample 7, which is a Comparative Example in which the thickness TL of each of the electrode layers 131a and 132a in the cross section of the ceramic body 110 in the first and second directions is 10 μm, but the thickness Tw of each of the electrode layers 131a and 132a in the cross section of the ceramic body 110 in the first and third directions is less than 7 μm, there is a problem in the moisture proof reliability.

On the other hand, it may be seen that in Samples 8, 9, 11, 12, 14, and 15, which are Inventive Examples in which the thicknesses TL of each of the electrode layers 131a and 132a in the cross section of the ceramic body 110 in the first and second directions and the thicknesses Tw of each of the electrode layers 131a and 132a in the cross section of the ceramic body 110 in the first and third directions are in a numerical range of the present disclosure, a high-capacitance multilayer ceramic capacitor having excellent moisture proof reliability may be implemented.

Meanwhile, it may be seen that in Samples 10 and 13, which are Comparative Examples in which the thicknesses TL of each of the electrode layers 131a and 132a in the cross section of the ceramic body 110 in the first and second directions are 15 μm and 20 μm, which are 10 μm or more, but the thicknesses Tw of each of the electrode layers 131a and 132a in the cross section of the ceramic body 110 in the first and third directions are less than 7 μm, there is a problem in the moisture proof reliability.

As set forth above, according to an exemplary embodiment in the present disclosure, a thickness of a sintered electrode layer including the conductive metal and the glass in the external electrode may be controlled to improve moisture proof characteristics, resulting in improvement of reliability of the multilayer ceramic electronic component.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and a plurality of internal electrodes disposed to face each other with each of the dielectric layers interposed therebetween, and having first and second surfaces opposing each other in a first direction, third and fourth surfaces opposing each other in a second direction and connected to the first and second surfaces, and fifth and sixth surfaces opposing each other in a third direction and connected to the first to fourth surfaces; and
external electrodes disposed on the third and fourth surfaces of the ceramic body in the second direction and electrically connected to the plurality of internal electrodes, respectively,
wherein the ceramic body includes an active portion in which capacitance is formed by including the plurality of internal electrodes and cover portions disposed on upper and lower surfaces of the active portion, respectively,
wherein a distance from the first surface of the ceramic body to an uppermost layer of the plurality of internal electrodes, or a distance from the second surface of the ceramic body to a lowermost layer of the plurality of internal electrodes, is 20 μm or less,
wherein the external electrodes each include an electrode layer electrically connected to the plurality of internal electrodes and a plating layer disposed on each electrode layer of the external electrodes,
wherein a thickness of each electrode layer of the external electrodes, in a central portion of the electrode layer in the first direction, which is an innermost layer of each of the external electrodes, in a cross section of the ceramic body in the first and second directions is 10 μm or more and less than 20 μm,
wherein a thickness of each electrode layer of the external electrodes, in a central portion of the electrode layer in the first direction, in a cross section of the ceramic body in the first and third directions is 7 μm or more and less than 10 μm.

2. The multilayer ceramic electronic component of claim 1, a thickness of each of the dielectric layers is 0.4 μm or less.

3. The multilayer ceramic electronic component of claim 1, a thickness of each of the plurality of internal electrodes is 0.4 μm or less.

4. The multilayer ceramic electronic component of claim 1, a thickness of each of the dielectric layers is 0.4 μm or less, and a thickness of each of the plurality of internal electrodes is 0.4 μm or less.

5. The multilayer ceramic electronic component of claim 1, wherein each electrode layer of the external electrodes is made of the same conductive metal as a material of the plurality of internal electrodes.

6. The multilayer ceramic electronic component of claim 1, wherein the plating layer includes a nickel plating layer and a tin plating layer disposed on the nickel plating layer.

7. A multilayer ceramic electronic component comprising:
a ceramic body including dielectric layers and a plurality of internal electrodes disposed to face each other with each of the dielectric layers interposed therebetween, and having first and second surfaces opposing each other in a first direction, third and fourth surfaces opposing each other in a second direction and connected to the first and second surfaces, and fifth and sixth surfaces opposing each other in a third direction and connected to the first to fourth surfaces; and
external electrodes disposed on the third and fourth surfaces of the ceramic body in the second direction and electrically connected to the plurality of internal electrodes, respectively,
wherein the ceramic body includes an active portion in which capacitance is formed by including the plurality of internal electrodes and cover portions disposed on upper and lower surfaces of the active portion, respectively, wherein a distance from the first surface of the ceramic body to an uppermost layer of the plurality of internal electrodes, or a distance from the second surface of the ceramic body to a lowermost layer of the plurality of internal electrodes, is 20 μm or less, wherein the external electrodes each include an electrode layer electrically connected to the plurality of internal electrodes and a plating layer disposed on each electrode layer of the external electrodes, wherein a thickness of each electrode layer of the external electrodes, in a central portion of the electrode layer in the first direction, which is an innermost layer of each of the external electrodes, in a cross section of the ceramic body in the first and third directions is 7 μm or more and less than 10 μm, wherein a thickness of each electrode layer of the external electrodes, in a central portion of the electrode layer in the first direction, in a cross section of the ceramic body in the first and second directions is 10 μm or more and less than 20 μm.

8. The multilayer ceramic electronic component of claim 7, a thickness of each of the dielectric layers is 0.4 μm or less.

9. The multilayer ceramic electronic component of claim 7, a thickness of each of the plurality of internal electrodes is 0.4 μm or less.

10. The multilayer ceramic electronic component of claim 7, a thickness of each of the dielectric layers is 0.4 μm or less, and a thickness of each of the plurality of internal electrodes is 0.4 μm or less.

11. The multilayer ceramic electronic component of claim 7, wherein each electrode layer of the external electrodes is made of the same conductive metal as a material of the plurality of internal electrodes.

12. The multilayer ceramic electronic component of claim 7, wherein the plating layer includes a nickel plating layer and a tin plating layer disposed on the nickel plating layer.

13. A multilayer ceramic electronic component comprising:
a ceramic body including dielectric layers and having first and second surfaces opposing each other in a thickness direction, third and fourth surfaces opposing each other in a length direction and connected to the first and second surfaces, and fifth and sixth surfaces opposing each other in a width direction and connected to the first to fourth surfaces;
a plurality of internal electrodes disposed in the ceramic body, each having one end exposed to the third or fourth surface in the length direction; and
external electrodes disposed on the third and fourth surfaces of the ceramic body and extending in the length direction to cover portions of the first, second, fifth, and sixth surfaces of the ceramic body, wherein the ceramic body includes an active portion in which capacitance is formed by including the plurality of internal electrodes and cover portions disposed on upper and lower surfaces of the active portion, respectively, wherein a distance from the first surface of the ceramic body to an uppermost layer of the plurality of internal electrodes, or a distance from the second surface of the ceramic body to a lowermost layer of the plurality of internal electrodes, is 20 μm or less, wherein the external electrodes each include an electrode layer electrically connected to the plurality of internal electrodes and a plating layer disposed on each electrode layer of the external electrodes, and wherein a maximum thickness of each electrode layer of the external electrodes, in a central portion of the electrode layer in the thickness direction, which is an innermost layer of each of the external electrodes, in the length direction of the ceramic body is 10 μm or more and less than 20 μm, wherein a thickness of each electrode layer of the external electrodes, in a central portion of the electrode layer in the thickness direction, in the width direction is 7 μm or more and less than 10 μm.

14. The multilayer ceramic electronic component of claim 13, a thickness of each of the dielectric layers is 0.4 82 m or less.

15. The multilayer ceramic electronic component of claim 13, a thickness of each of the plurality of internal electrodes is 0.4 μm or less.

16. The multilayer ceramic electronic component of claim 13, a thickness of each of the dielectric layers is 0.4 μm or less, and a thickness of each of the plurality of internal electrodes is 0.4 μm or less.

17. The multilayer ceramic electronic component of claim 13, wherein each electrode layer of the external electrodes is made of the same conductive metal as a material of the plurality of internal electrodes.

18. The multilayer ceramic electronic component of claim 13, wherein the plating layer includes a nickel plating layer and a tin plating layer disposed on the nickel plating layer.

* * * * *